No. 875,441. PATENTED DEC. 31, 1907.
P. J. LEAVENS.
SAW SET.
APPLICATION FILED APR. 15, 1907.

WITNESSES
S. M. Gallagher
J. J. Williamson

INVENTOR
Philip J. Leavens
BY
W. Preston Williamson
ATTORNEY

THE NORRIS PETERS CO., WASHINGTON, D. C.

UNITED STATES PATENT OFFICE.

PHILIP J. LEAVENS, OF VINELAND, NEW JERSEY.

SAW-SET.

No. 875,441.  Specification of Letters Patent.  Patented Dec. 31, 1907.

Application filed April 15, 1907. Serial No. 368,173.

*To all whom it may concern:*

Be it known that I, PHILIP J. LEAVENS, a citizen of the United States, residing at Vineland, county of Cumberland, and State of New Jersey, have invented a certain new and useful Improvement in Saw-Sets, of which the following is a specification.

My invention relates to a new and useful improvement in saw sets, and has for its object to provide one or more compressible surfaces for clamping the blade of a saw when inserted in a saw set, whereby the saw will be accurately held in place with a sufficient amount of friction to facilitate the operation of setting the teeth thereof.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
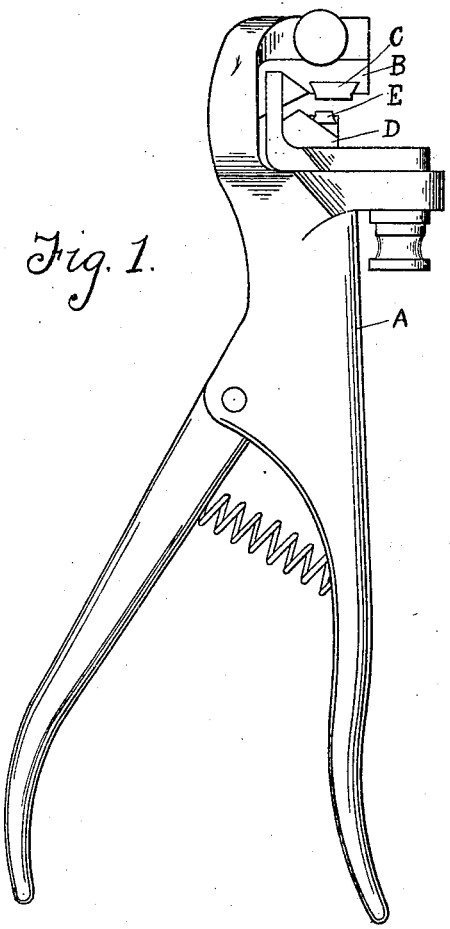
Figure 2:
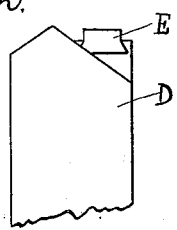
Figure 3:
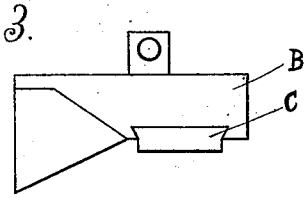

Figure 1 represents a saw set of any well known construction showing my improvement applied thereto. Fig. 2, an enlarged view of the inner end of the plunger showing a compressible block set therein. Fig. 3, an enlarged view of the anvil showing a compressible block set therein.

In carrying out my invention as here embodied, A represents a saw set of any design or construction, and B the anvil of such a set, and in this anvil I secure a block C of rubber or other suitable compressible material.

D represents the plunger of the set, and in this plunger is also secured a block E of rubber or other suitable material.

When my improvement is applied to a saw set it greatly facilitates the setting of the teeth of a saw, in that when the blade is inserted in the tool the first action will be to clamp the blade of the saw prior to pressure being brought to bear upon the teeth to set the same, thus preventing the set from slipping off the blade or becoming displaced during the setting operation.

Of course I do not wish to be limited to the use of my improvement in connection with any particular design of saw set as it may be applied to a saw set of any construction adapted to receive the same, nor do I wish to be limited to the use of two blocks of compressible material as in some designs of saw sets a single block will answer the purpose.

Having thus fully described my invention, what I claim as new and useful, is—

In combination with a saw set a stationary jaw member supporting an anvil a working face on the anvil against which the saw tooth is bent, a depression in the face of the anvil, an elastic block adapted to fit within said depression, a movable jaw member, a plunger adjacent to the elastic block and actuated by said movable jaw and so arranged as to clamp the jaw tooth between the anvil and the plunger.

In testimony whereof, I have hereunto affixed my signature in the presence of two subscribing witnesses.

PHILIP J. LEAVENS.

Witnesses:
S. T. WILLIAMS,
EDNA L. SAUL.